Figure 1:
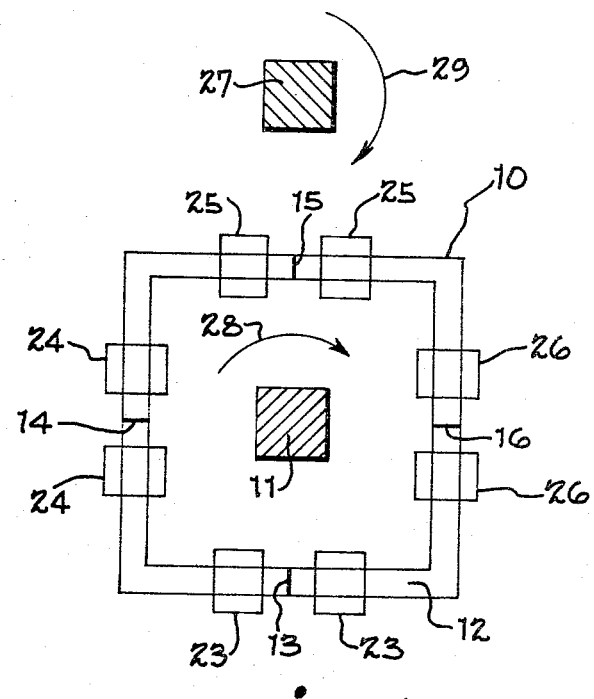

May 30, 1967 T. L. HALEY 3,323,057
HALL GENERATOR CURRENT METER HAVING EXTRANEOUS
FIELD COMPENSATING APPARATUS
Filed May 2, 1966 2 Sheets-Sheet 1

INVENTOR
Thomas L. Haley
By Mary E. Haley,
Administratrix
BY Wood, Herron & Evans.
ATTORNEYS.

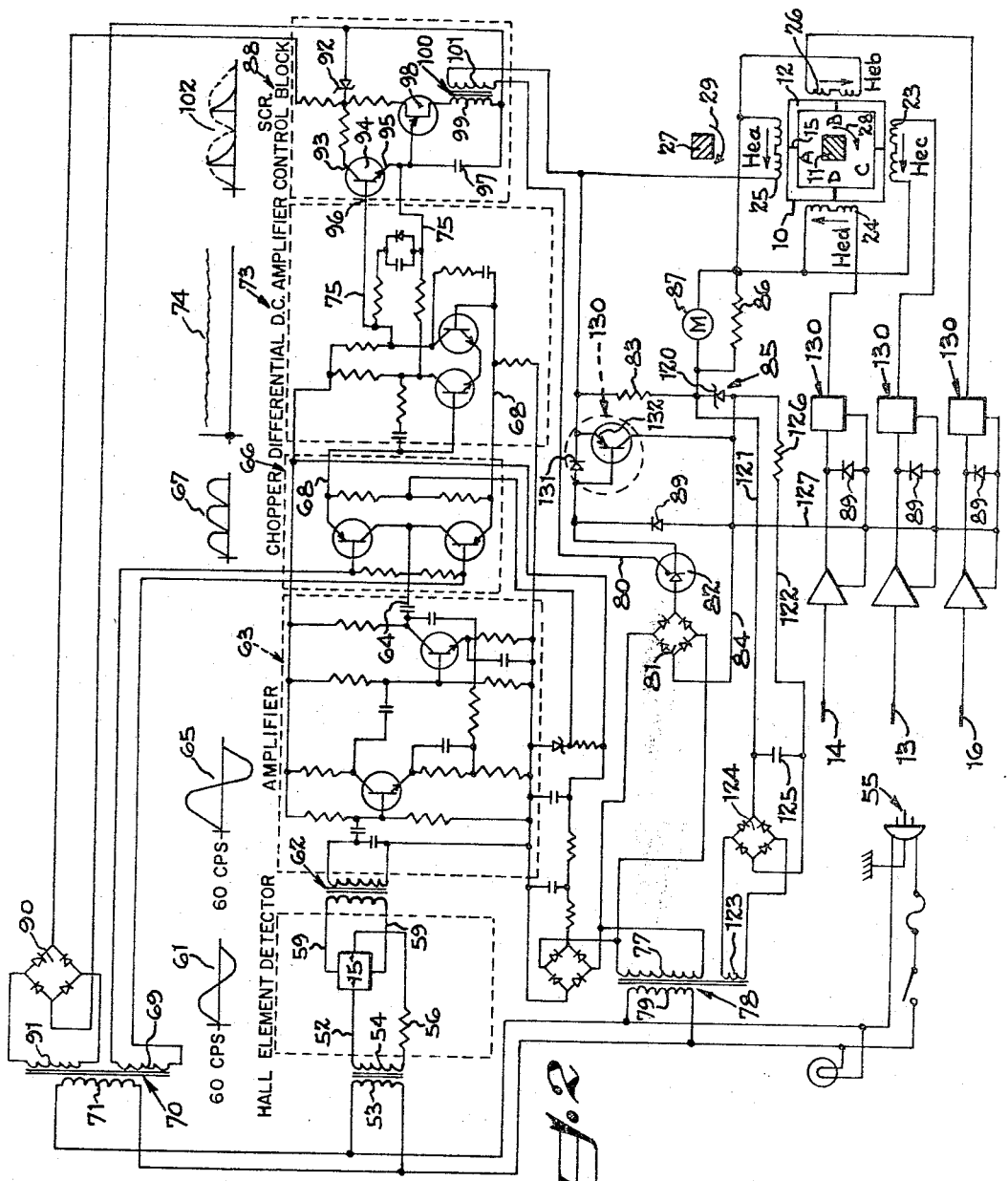

United States Patent Office 3,323,057
Patented May 30, 1967

3,323,057
HALL GENERATOR CURRENT METER HAVING EXTRANEOUS FIELD COMPENSATING APPARATUS
Thomas L. Haley, deceased, late of Columbus, Ohio, by Mary Elizabeth Haley, administratrix, Columbus, Ohio, assignor to Halmar Electronics Incorporated, Columbus, Ohio, a corporation of Ohio
Filed May 2, 1966, Ser. No. 547,394
5 Claims. (Cl. 324—117)

This is a continuation-in-part of copending application Ser. No. 292,952, filed July 5, 1963.

In the parent application referred to above, apparatus for measuring direct current of very great magnitude is described. Currents of the order of thousands of amperes or even hundreds of thousands of amperes occur in single current carrying buses used in electrochemical processes includng processes for the extraction of aluminum from bauxite ore. The accurate measurement of currents of these magnitudes has presented a difficult problem for which the apparatus described in the parent application provides a solution.

The apparatus of that application includes a core of high magnetic permeability which surrounds the bus, the core having one or more air gaps into which a Hall element is mounted. The Hall element is a solid state device which produces a voltage whose magnitude is directly proportional to the flux density in the core and the flux density of the core is directly proportional to the magnetizing force H produced by the current in the bus, the magnetizing force being directly proportional to the current flowing through the bus.

Thus, through the use of a core, a Hall element in the air gap of the core, and a meter for determining the voltage output of the Hall element, it is theoretically possible to obtain a direct reading of the current passing through a bus. However, as a practical matter, the core saturates at very low magnitudes of current and therefore the simple system described above is useless in the measurement of currents in excess of a few thousand amperes. The apparatus of the parent application provides opposition coils surrounding the core and a feedback circuit from the Hall element to the opposition coils to produce in the core a flux equal to and in opposition to the flux developed by the magnetizing force of the current flowing through the bus. Through the application of the opposition flux to the core through the feedback system, the flux density in the core is maintained substantially at zero. If the geometrical relationship of the core to the bus is perfectly symmetrical and if no extraneous fields from adjoining buses affect the system, the system described works perfectly satisfactorily.

In practice, however, the apparatus as applied to a bus carrying currents of the order of five thousand amperes becomes extremely sensitive to the position of the core with respect to the bus. Further, there are many instances in which the buses adjacent to that about which the core is mounted develop high density extraneous fields which tend to drive small segments of the core to saturation. The parent application provides apparatus, particularly in what is now referred to as the multi-channel system, for eliminating position sensitivity as well as localized saturation of the core due to extraneous fields. In the multi-channel system, the core has a plurality of Hall elements spaced along the length of the core, each Hall element having its own feedback loop to opposition windings usually positioned on both sides of the Hall element. While four channels are described in that application, the concept has been extended to a core employing sixteen distinct channels and this core has demonstrated a capability of measuring up to two hundred thousands amperes.

The multi-channel system senses the flux or magnetic force at many points around the core and brings these points to approximately zero flux by producing the opposition flux in the coils at the location on the core where the flux is developed either by the bus or by the extraneous field. Each Hall detector senses the flux in a short length of core and the amplified Hall output voltage drives the current through the feedback coils located on either side of the Hall plates. In this manner, the magnetizing force H applied to the core can never be so concentrated as to build up an appreciable flux density let alone saturate the iron core.

The present invention is directed to electrical apparatus for compensating for external fields and particularly those external fields which produce a "negative" magnetizing force greater than the magnetizing force generated by the current in the bus over a portion of the core. Throughout this description, the term "positive" will be used to denote the direction of flux or magnetizing force as is produced by the bus current which is to be measured. The term "negative" is used to denote flux or magnetizing force which is oriented in the opposite direction.

In the system described in the parent application, the opposition coils can develop a negative flux in opposition to that developed by the current in the bus; but when the external field is of a negative flux density so great that it not only overcomes the magnetizing force of the bus but actually produces a negative flux in the core in the same direction as that normally produced by the opposition coils, the feedback system previously described is incapable of producing a flux in a positive direction, that is, in a direction opposite to its normal opposition direction. Thus, the external fields could create a condition in a portion of the core which is such that the Hall detector and its feedback loop would not produce a signal proportional to the magnetizing force in that portion of the core created by the current in the bus. As a consequence, the sum of the opposition currents of all feedback loops in all channels would not present a true picture of the current flowing in the bus.

To provide compensation for negative external fields, the present invention includes means for providing a reverse or positive magnetizing force, preferably of constant magnitude, which is in the same direction as the magnetizing force of the bus. The constant reverse field effectively raises the operating level of the system into the positive range to the extent that no negative extraneous field can depress the flux into the negative range in any section of the core.

The several features of the invention and its operation will become more readily understood from the following detailed description taken in conjunction with the accompanying drawings in which, FIG. 1 is a diagrammatic illustration of a core and windings of the present invention as applied to a bus, and FIG. 2 is a circuit diagram illustrating a four-channel measuring system.

As illustrated in FIG. 1, a head 10 is mounted around a current carrying bus 11. The head includes a high permeability core 12 having four Hall elements or detectors 13, 14, 15 and 16 in its air gaps. Each of the Hall elements is connected by circuitry to be described below to respective opposition windings 23, 24, 25 and 26. The structure by which the head, including the core windings and Hall elements, is mounted is illustrated in the copending parent application referred to above.

The objective of the present invention has been to provide the circuitry associated with the head 10 which will measure the current flowing through the bus 11, the circuitry providing assurance that the measuring apparatus is substantially insensitive to the position of the head with respect to the bus or to irregularities in the cross sectional configuration of the bus. Further, the circuitry is adapted to compensate for the effects of extraneous fields such as are produced by an adjoining bus 27.

In the illustrated embodiment, it will be assumed that the current in the buses 11 and 27 is a direct current which is flowing into the page and the flux generated by the respective buses is in the direction of the arrows 28 and 29. The magnetizing force produced by the flux from the bus 11 ($H_b$) is clockwise as viewed in FIG. 1 and this will be referred to as a positive magnetizing force. The opposition windings 23–26 will normally produce a magnetizing force $H_w$ in the opposite direction and this will be referred to as a negative magnetizing force. The current in the adjacent bus 27 produces a flux 29 which is in a clockwise direction and is referred to as the extraneous field $H_e$. The direction of the magnetizing force of the extraneous field in legs 13, 14, and 16 of the core is positive and in the leg containing Hall element 15, the magnetizing force is in a negative direction.

The electrical circuit

The electrical circuit for the current measuring apparatus is diagrammatically illustrated in FIG. 2 and is basically the same circuit disclosed in the parent application except for the extraneous field compensation circuit. The core 12 and windings 23–26 around the core are illustrated at the lower right-hand corner of the circuit diagram.

The four Hall elements 13–16 are disposed in the core air gaps as described above and each has control leads 52 connected to a transformer 53 having a secondary winding 54. The transformer 53 is connected to a 115 volt alternating current supply indicated at 55. The control leads are in series with a resistor 56 which limits the control current. Each Hall element has Hall or output leads 59.

The Hall voltage in the output 59 is a function of the flux density in the core 12 and it is the purpose of the circuit described below to amplify the Hall voltage and feed it back to its respective winding 25 so that the total opposition flux from all windings 23–26 will be equal to the flux in the core developed by the current passing through the conductor 11. The circuitry by which this is accomplished is constituted in general as follows:

The output of the Hall element detector indicated at 59 has an alternating current sine wave form illustrated at 61. It is fed through a transformer 62 into an alternating current amplifier 63, the output of which indicated at 64 is an alternating current sine wave illustrated at 65. The output of amplifier 63 is fed into a chopper 66. The chopper 66 functionally operates as a switch to invert the negative wave of the amplifier output to provide a direct current wave illustrated at 67 at the output 68 of the chopper. The switching is triggered by a secondary winding 69 of transformer 70 whose primary 71 is connected to the alternating current supply 55, the output of winding 69 forming the chopper drive.

The output of the chopper is fed into a differential direct coupled amplifier and filter 73 which amplifies the chopper output and converts it to a low ripple wave form indicated at 74, that wave form appearing at the output 75 of the differential amplifier.

Thus far, the function of the circuit has been to amplify the alternating current output voltage from the Hall elements 15 and convert it to a low ripple direct current voltage 74. The magnitude of the output voltage 74 of the amplifier is a direct function of the amplitude of the output voltage of the Hall elements which in turn is directly dependent upon the current flowing through the conductor 11. The output voltage 74 then is to be employed to control the current flowing through the opposition winding 25.

The current in the winding 25 is supplied from the secondary 77 of the transformer 78 whose primary winding 79 is connected across the alternating current supply 55. The secondary 77 is connected across the alternating current supply 55. The secondary 77 is connected across a full wave rectifier 81. One output lead of the rectifier 81 is connected through a silicon controlled rectifier (SCR) 82 to the opposition winding 25. The other output lead 84 is connected to the other side of the opposition winding through a reverse current source 85 and a summing resistor 86 across which a meter 87 is connected. A holding resistor 83 of high resistance is connected across the SCR output to provide assurance of the firing of the SCR. The meter 87, measuring the feedback current to the opposition windings, provides, with suitable calibration, a measurement of the current passing through the conductor 11.

The silicon controlled rectifier 82 permits the passage of current to the opposition winding but only passes current or conducts when it is triggered by a voltage of a suitable magnitude from lead 80. To provide that voltage pulse, the circuit incorporates a control block 88 for the silicon controlled rectifier. The control block sends to the silicon controlled rectifier a pulse during each half cycle, that is, during each pulse from the full wave rectifier 81. The angle of the pulse, that is, the instant during the half cycle in which it occurs, from the control block determines the point in time at which the rectifier 82 will fire. The rectifier 82, when fired, will continue to conduct until the voltage from the rectifier bridge 81 goes to zero. Thereafter, conduction through rectifier 82 will discontinue until it has been again initiated by another pulse from the control block. During that portion of the cycle when the rectifier 82 is not conducting, the decaying current in the coil 25 has a path through rectifier 89.

The energy for the control block pulse is obtained from a bridge rectifier 90 which is connected across a secondary 91 of transformer 70. The rectified current is fed through a Zener diode 92 to the collector terminal 93 of a transistor 94. The transistor 94 acts as a valve for the clipped full wave rectified current passing through the Zener diode 92. The magnitude of the current passing from the collector 93 to the emitter 95 is controlled by the magnitude of the voltage on the base 96 which is dependent upon the output voltage of the differential direct current amplifier 73.

Current from the transistor 94 charges a condenser 97. When the charge on the condenser reaches a certain level, controlled by the unit junction transistor 98, the condenser discharges through a primary winding 99 of transformer 100, the secondary winding 101 of which is connected to the silicon controlled rectifier 82, thereby firing the SCR, the wave form of the output of secondary winding 101 being illustrated at 102.

The reverse current source 85 is connected in series with the SCR circuit of each channel and its polarity is such as to tend to apply a current to each winding which would develop a positive magnetizing force (in the same direction as that from the bus) $H_r$. The reverse current source includes a Zener diode 120 having a voltage across its terminals of from 6 to 24 volts D.C. applied through a positive line 121 and a negative line 122. The voltage is derived from a secondary 123 of transformer 78 through a full wave bridge rectifier 124. The output of the rectifier is connected across a filtering capacitor 125 and through a current limiting resistor 126. The SCR circuits of all four channels are connected to the negative side of the reverse current source 85 through line 127. The positive side of the reverse current source 85 is connected to the summing resistance 86 and the summing resistance is connected to one side of each of the separate windings 23–26 of the respective channels. The other side of each of the opposition windings 23–26 is connected through a switching block 130 in series with the SCR circuit of each channel. Each switching block 130 includes a diode 131 and a reverse current transistor 132 whose emitter and base are connected across the diode 131 and whose collector is connected to the negative side of the reverse current source. The transistor diode combination 131, 132 is termed a switching block because the presence or absence of a drop across the diode 131 will determine whether or not the transistor 132 will conduct and consequently whether a return pass is provided through the transistor 132 from the reverse current source 120.

The operation of the compensating circuit is as follows: With no current flowing through the bus 11, the reverse current source will tend to drive current through the windings 23–26 through a path which includes the summing resistance 86, the winding and the reverse current transistor 132 of each channel back to the negative side of the reverse current source 85. Each Hall detector 13–16 will detect the flux created by the reverse current through the windings and will produce a feedback voltage applied to the winding. Thus, the feedback amplifiers in each channel must supply a sufficient voltage to just balance the Zener diode voltage from the reverse current source 85. If the feedback amplifiers tend to produce too much output voltage they will force a forward current to flow through the windings or if they produce too little, a reverse current from the reverse current source will flow through the windings but in either case, the Hall plate will detect the flux created by the forward or reverse current and will produce a signal which corrects the unbalance so that no current flows through the feedback coils.

Thus, during conditions of no current flow through the bus 11, each of the feedback channels is operating at a level which would normally be produced by a substantial current passing through the bus 11 which would produce a positive magnetizing force. In other words, the feedback channels are operating as though there were a positive magnetizing force developed inside the core window and if one or more legs of the core were subjected to a negative external field, the feedback channel associated with that leg would see that negative magnetizing force not as a negative force but rather as a less positive force than it sees when there is no external field.

When current flows through the bus 11, and no external field is applied, each feedback channel generates sufficient voltage to force a forward current through each feedback coil against the reverse current source, the forward current creating the opposition flux to counteract the flux created by the current in the bus.

The forward current produces a small voltage drop across the diode 131 from base to emitter of the reverse current transistor 132 in each channel. This voltage drop cuts off the transistor, thereby preventing current from flowing back to the feedback channel through this path.

Now let it be assumed that a large external field is present adjacent the core 12. That external field could be created by an adjoining bus 27 located adjacent the leg of the core containing the winding 25. For convenience of discussion, let it be assumed that that leg is the A leg and the remaining three legs lettered clockwise around the core B, C and D legs. The magentizing force of any field when integrated around a closed loop external to the source of the field will be zero. Therefore, when integrated around the core 12, the magnetizing force of the external field generated by the current through the bus 27 will be zero. The field will, however, product a large negative vector in leg A ($H_{ea}$) and will produce positive vectors in legs B, C and D since the integration of the magnetizing force around a closed loop not enclosing the current source of the force yields zero, $H_{ea}+H_{eb}+H_{ec}+H_{ed}=0$.

If the vector ($H_{ea}$) is less than the magnetizing force $H_b$ in the A leg which is produced by the enclosed conductor 11, the system operates generally as described above as though there were current flowing through the bus 11 with no external field. Due to the fact, however, that the apparatus of the present invention has a separate Hall detector and feedback channel for each leg of the core, the opposition flux produced by winding 25 will necessarily be greater than the opposition flux produced by the windings 23, 24 and 26 in the remaining three legs. However, the current in all windings flows through the common summing resistor 86 so that the reading on the meter 87 reflects the total current flowing through the bus 11.

When the magnetizing force $H_{ea}$ from the external field 29 is sufficient to overcome the internal magnetizing force from the bus 11 resulting in a total negatively oriented magnetizing force on the leg A, the reverse current source and associated circuitry compensates for the condition produced. The Hall detector 15 in leg A will sense a negative flux and call for negative feedback current. The output voltage of the amplifier in the A channel will decrease to some voltage less than the voltage across the reverse current source 85. The reverse current source will drive current through the feedback or opposition coils 25 in a positive direction to balance the total negative magnetizing force $H_{ea}$. Since current is not flowing through the diode 131, there is no drop across the base and emitter of the transistor 132 as would prevent current flow through that transistor. The transistor is therefore conductive to provide a reverse current path back to the negative side of the reverse current source.

A reverse current actually does not flow out of the source 85. Rather, the reverse current source applies a positive bias to the point at which the four opposition windings flow into the summing resistor. Thus, under the conditions set forth above, the external field 29 creates excess positive magnetizing force in the core legs B, C and D. The Hall detectors and feedback amplifiers supply excess current to their respective windings to bring the total magnetizing force in those legs to zero. That excess current flows toward the summing resistor 86 and a portion of it, equivalent to that required to overcome the magnetizing force of the bus 11, flows through the summing resistor. The remaining current finds a path through the winding 25 of leg A in a direction opposite to the normal path of current through that winding. The current through the winding finds a return path to the negative side of the reverse current source through the transistor 132. The flow of current through the winding 25 is adjusted by the amplifier decreasing the SCR conduction angle until the Hall detector in leg A sees approximately zero flux. At zero flux, the negative magnetizing force on leg A is balanced by the current from the reverse current source which, in reality, is the excess current from the other three channels.

Thus, the circuit provides for continuous measurement of the current in the bus 11 as well as continuous compensation for the effects of extraneous fields, even those fields which create a magnetizing force in a leg greater than that of the internal current through the bus.

In the preferred embodiment, compensation for the negative extraneous field is provided in part by the reverse current source 85. It should be understood that it is also possible to compensate for extraneous negative fields by the use of separate windings mounted on the core, the windings being supplied by a current source which will produce in the core a constant, positive, magnetizing force. This is somewhat impractical because of the bulk and additional expense required by the added winding as well as the problem of calibrating the meter across the summing resistor. In either event, the extraneous field compensating means should preferably raise the level of operation between five and fifty percent of the rating of the current measuring apparatus. In the preferred embodiment, the level of operation is determined by the voltage of the reverse current source and has the capability of raising the level to one hundred percent of the rating of the current measuring apparatus.

I claim:

1. Apparatus for measuring current in a bus subjected to intense stray magnetic fields generated by adjacent buses, said apparatus comprising, a core having at least two spaced air gaps adapted to be mounted around said bus, at least two Hall elements each having an output and disposed in a different one of said air gaps in said core, at least two opposition windings surrounding said core said windings surrounding said core adjacent different ones of said Hall elements, a feedback circuit connecting the outputs of said Hall elements to said respective windings to provide a negative magnetizing force in said core substantially equal and opposite to the positive magnetizing force created by the current in said bus, a reverse current source connected to said windings for creating a magnetizing force in said core in the same direction as the magnetizing force created by the current in said bus to effectively raise the operating level of the measuring apparatus into the positive flux range to the extent that no negative extraneous magnetic field can depress the flux into the negative range in any section of the core and measuring means associated with said windings to measure the total current flowing therein.

2. Apparatus for measuring current in a bus subjected to intense stray magnetic fields generated by adjacent buses, said apparatus comprising, a core adapted to be mounted around said bus, a plurality of Hall elements having outputs and disposed in air gaps spaced around said core, at least one opposition winding wound on said core adjacent each Hall element, a feedback circuit connecting the output of each said Hall element to its respective winding to provide a negative magnetizing force in said core in opposition to the positive force detected by said Hall element, a summing resistor, means connecting said summing resistor to all said windings, a meter connected to said summing resistor to measure the total current passing from said windings through said resistor, a reverse current source in series with said summing resistor, said reverse current source applying a voltage to said summing resistor in opposition to said flow of current developed through said feedback circuit to effectively raise the operating level of the measuring apparatus into the positive flux range to the extent that no negative extraneous magnetic field can depress the flux into the negative range in any section of the core.

3. Apparatus according to claim 3 further comprising, a return circuit for said reverse current source including a connection across the output of said feedback circuit, and automatic switching means blocking flow of current through said reverse current connection when current flows through said feedback circuit to said windings.

4. Apparatus according to claim 4 in which said return circuit and switching means comprise a transistor having an emitter and collector connected across the feedback circuit output, a diode in series with said feedback output, the diode having a terminal connected to the base of said transistor.

5. Apparatus for measuring current in a bus subjected to intense stray magnetic fields generated by adjacent buses, said apparatus comprising:

a core adapted to be mounted around said bus and having at least two air gaps, at least two Hall elements, each having an output and disposed in a different one of said air gaps in said core, at least one opposition winding for each Hall element, said winding being wound on said core adjacent its respective Hall element, a feedback circuit connecting the outputs of said Hall elements to said respective windings to provide a negative magnetizing force in the core substantially equal and opposite to the positive magnetizing force created by the current in said bus, circuit means associated with said core for applying to said core a reverse magnetizing force which is in the same direction of the force created by the current in said bus to effectively raise the operating level of the measuring apparatus into the positive flux range to the extent that no negative extraneous magnetic field can depress the flux into the negative range in any section of the core and measuring means associated with said windings to measure the total current flowing therein.

References Cited

UNITED STATES PATENTS

| 1,880,412 | 10/1932 | Burton | 336—171 X |
| 1,995,530 | 3/1935 | Askey | 323—45 |
| 2,412,070 | 12/1946 | Wagner | 324—127 |

FOREIGN PATENTS 618,580  4/1961  Canada.

WALTER L. CARLSON, *Primary Examiner.*

RUDOLPH V. ROLINEC, *Examiner.*

J. J. MULROONEY, *Assistant Examiner.*

UNITED STATES PATENT OFFICE
CERTIFICATE OF CORRECTION

Patent No. 3,323,057 May 30, 1967

Thomas L. Haley, deceased, by
Mary Elizabeth Haley, administratrix

It is hereby certified that error appears in the above numbered patent requiring correction and that the said Letters Patent should read as corrected below.

Column 7, line 51, for the claim reference numeral "3" read -- 2 --; column 8, line 7, for the claim reference numeral "4" read -- 3 --.

Signed and sealed this 2nd day of January 1968.

(SEAL)
Attest:

Edward M. Fletcher, Jr.
Attesting Officer

EDWARD J. BRENNER
Commissioner of Patents